(12) United States Patent
Komiyama

(10) Patent No.: US 9,304,302 B2
(45) Date of Patent: Apr. 5, 2016

(54) WIDE-ANGLE LENS

(71) Applicant: NIDEC SANKYO CORPORATION, Nagano (JP)

(72) Inventor: Tadashi Komiyama, Nagano (JP)

(73) Assignee: NIDEC SANKYO CORPORATION (JP)

( * ) Notice: Subject to any disclaimer, the term of this patent is extended or adjusted under 35 U.S.C. 154(b) by 69 days.

(21) Appl. No.: 14/225,608

(22) Filed: Mar. 26, 2014

(65) Prior Publication Data

US 2014/0293456 A1    Oct. 2, 2014

(30) Foreign Application Priority Data

Mar. 28, 2013  (JP) ................................ 2013-070270
Feb. 18, 2014  (JP) ................................ 2014-028741

(51) Int. Cl.
*G02B 13/18*    (2006.01)
*G02B 13/00*    (2006.01)
*G02B 13/04*    (2006.01)

(52) U.S. Cl.
CPC ............ *G02B 13/18* (2013.01); *G02B 13/0035* (2013.01); *G02B 13/04* (2013.01)

(58) Field of Classification Search
CPC ..... G02B 13/18; G02B 13/0035; G02B 13/04
See application file for complete search history.

(56) References Cited

U.S. PATENT DOCUMENTS

2012/0212839 A1 *  8/2012  Hsu et al. ................ 359/716

FOREIGN PATENT DOCUMENTS

| EP | 2 784 562 A1 | * | 10/2014 |
| JP | 2006-162829 A | * | 6/2006 |
| JP | 4268323 B2 | | 5/2009 |
| JP | 2010-014855 A | * | 1/2010 |

OTHER PUBLICATIONS

NPL European Search Opinion for EPO Application No. 14160758, prepared on Jun. 13, 2014.*

* cited by examiner

*Primary Examiner* — David N Spector
(74) *Attorney, Agent, or Firm* — Cantor Colburn LLP

(57) ABSTRACT

A wide-angle lens may include a first lens which is a plastic lens having first and second faces that are aspherical and having a negative meniscus shape with a convex surface facing an object side, a second lens which is a plastic lens in a biconvex shape having at least one aspherical face, a third lens which is a plastic lens in a biconvex shape having at least one aspherical face, and a diaphragm provided between the second lens and the third lens. The first lens may be provided closest to the object side and the second lens may be between the first lens and the third lens. A radius of curvature at a center of a second face located on an image side of the first lens "R12" (mm) and a focal length of the wide-angle lens "f0"(mm), satisfy the following condition:

$R12/f0 \leq 0.9.$

9 Claims, 5 Drawing Sheets

Magnification Chromatic Aberration

Magnification Chromatic Aberration

Astigmatism / Field Curvature

Magnification Chromatic Aberration

Astigmatism / Field Curvature

Magnification Chromatic Aberration

Astigmatism / Field Curvature

Magnification Chromatic Aberration

Astigmatism / Field Curvature

Magnification Chromatic Aberration

Astigmatism / Field Curvature

WIDE-ANGLE LENS

CROSS REFERENCE TO RELATED APPLICATION

The present invention claims priority under 35 U.S.C. §119 to Japanese Application No. 2013-070270 filed Mar. 28, 2013 and Japanese Application No. 2014-028741 filed Feb. 18, 2014, the entire contents of which are incorporated herein by reference.

FIELD OF THE INVENTION

At least an embodiment of the present invention may relate to a wide-angle lens which is used in various image pickup systems.

BACKGROUND

A lens which is mounted on a monitoring camera, an on-vehicle camera and a camera for a portable apparatus is required to have a viewing angle of 90 degrees or more and to reduce its aberration so as to attain sufficient resolution. Further, the lens is also required that the number of lenses is suppressed to a minimum from the standpoint of cost. Therefore, a lens has been proposed which is constituted to be three lenses in three groups and in which the ratio of focal lengths and the ratio of Abbe numbers of the respective lenses are set in predetermined conditions (see Japanese Patent No. 4268323).

However, it is required that the "F"-value indicating brightness of the entire lens system and a level of aberration are further reduced in comparison with the wide-angle lens described in the above-mentioned Patent Literature.

SUMMARY

In view of the objective described above, at least an embodiment of the present invention may advantageously provide a wide-angle lens in which the "F"-value is capable of being reduced and the aberration can be further reduced.

According to at least an embodiment of the present invention, there may be provided a wide-angle lens comprising a first lens which is a plastic lens whose both faces are aspherical and having a negative meniscus shape whose convex surface is faced to an object side, a second lens which is a plastic lens in a biconvex shape whose at least one face is aspherical, a third lens which is a plastic lens in a biconvex shape whose at least one face is aspherical, and a diaphragm which is provided between the second lens and the third lens. The first lens, the second lens, and the third lens are disposed in this order from an object side. In addition, when a radius of curvature at a center of a second face located on an image side of the first lens is "R12"(mm) and a focal length of the entire lens system is "f0"(mm), the following condition is satisfied:

$$R12/f0 \leq 0.9$$

A wide-angle lens in accordance with at least an embodiment of the present invention has a lens constitution of three lenses in three groups and the three lenses are plastic lenses. Therefore, a cost of the wide-angle lens can be reduced and its weight is capable of being reduced. Further, in at least an embodiment of the present invention, the second face of the first lens is formed in a shape which is deeply recessed to a level satisfying the above-mentioned expression by utilizing that the first lens is a plastic lens and, in addition, an aspherical lens is used as the first lens, the second lens and the third lens. Therefore, the astigmatism and field curvature can be improved while the lens is a wide-angle lens and thus the resolution can be improved. Further, the "F"-value of the entire lens system can be reduced. In addition, a diaphragm is disposed between the second lens and the third lens which are respectively biconvex lenses having positive power and thus deviation of a focusing position caused by temperature change can be reduced.

In at least an embodiment of the present invention, when a horizontal viewing angle is not less than 120 degrees, the Abbe number of the second lens is "v2", the Abbe number of the third lens is "v3", and a refractive index of the second lens is "n2", the following conditions are satisfied:

$$1.60 < n2$$

$$2.0 \leq v3/v2$$

According to this constitution, in addition to improvement of the astigmatism and the field curvature and reduction of the "F"-value, chromatic aberration can be improved.

In at least an embodiment of the present invention, when a horizontal viewing angle is not less than 90 degrees and less than 120 degrees, the Abbe number of the second lens is "v2", the Abbe number of the third lens is "v3", and a refractive index of the second lens is "n2", the following conditions are satisfied:

$$1.55 < n2$$

$$1.5 < v3/v2 < 2.0$$

According to this constitution, in addition to improvement of the astigmatism and the field curvature and reduction of the "F"-value, chromatic aberration can be improved.

In at least an embodiment of the present invention, hard coating is applied on a first face located on the object side of the first lens. According to this structure, even when the first lens is a plastic lens, scratch resistance and abrasion resistance of the first face can be improved. Therefore, occurrence of ghost flare caused by a scratch or abrasion on the first face of the first lens can be suppressed.

In at least an embodiment of the present invention, an "F"-value indicating brightness of the entire lens system is not more than 2.4.

In at least an embodiment of the present invention, when a radius of curvature of a first face of the third lens is "R31" (mm) and a radius of curvature of a second face of the third lens is "R32"(mm), the following condition is satisfied:

$$R32 < R31$$

According to this structure, the astigmatism and the field curvature can be further improved.

In at least an embodiment of the present invention, both faces of each of the second lens and the third lens are aspherical.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of a wide-angle lens to which the present invention is applied will be described below with reference to the accompanying drawings.

[First Embodiment]

Figure 1A:
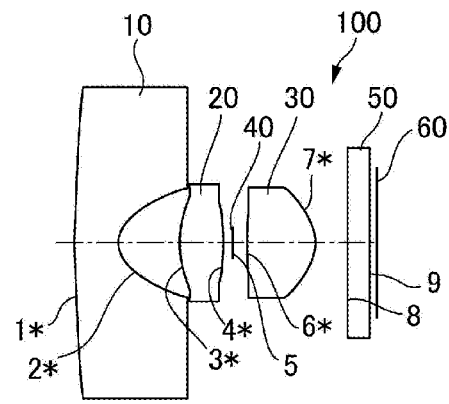
FIGS. 1(a), 1(b) and 1(c) are explanatory views showing a wide-angle lens in accordance with a first embodiment of the present invention.
Figure 1B:
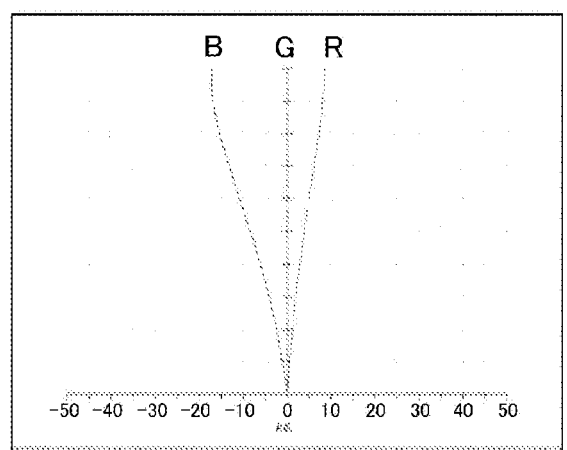
Figure 1C:
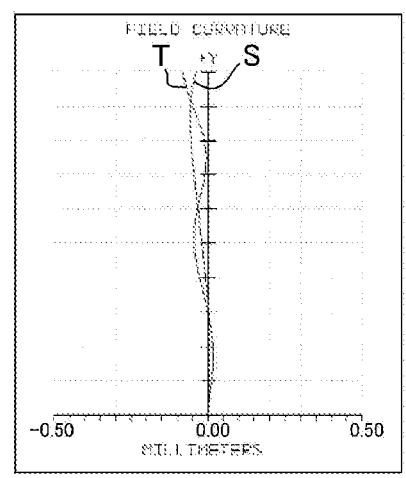

FIGS. 1(a), 1(b) and 1(c) are explanatory views showing a wide-angle lens in accordance with a first embodiment of the present invention. FIG. 1(a) is an explanatory view showing a constitution of the lens, FIG. 1(b) is an explanatory view showing characteristics of the magnification chromatic aberration, and FIG. 1(c) is an explanatory view showing the astigmatism/field curvature. In respective faces 1 through 9 in FIG. 1(a), an aspherical surface is referred with "*". FIG. 1(b) shows the chromatic aberrations of red light "R" (wavelength 486.1 nm), green light "G" (wavelength 587.6 nm) and blue light "B" (wavelength 656.3 nm). In FIG. 1(c), "S" shows characteristic in a sagittal direction and "T" shows characteristic in a tangential direction. FIGS. 2(a), 2(b) and 2(c) through FIGS. 5(a), 5(b) and 5(c) are similarly shown as described above.

As shown in FIG. 1(a), a wide-angle lens 100 in this embodiment is comprised of a first lens 10, a second lens 20, and a third lens 30 which are disposed in this order from an object side, and a diaphragm 40 is provided between the second lens 20 and the third lens 30 and the wide-angle lens 100 has a lens constitution of three lenses in three groups. A filter 50 and an imaging element 60 are disposed on an image side relative to the third lens 30.

The first lens 10 is a plastic lens whose both faces are aspherical and having a negative meniscus shape whose convex surface is faced to an object side. The second lens 20 is a plastic lens in a biconvex shape whose at least one face is aspherical and the third lens 30 is a plastic lens in a biconvex shape whose at least one face is aspherical. In this embodiment, in the second lens 20 and the third lens 30, both faces are aspherical. Further, in this embodiment, the first lens 10 is made of acrylic resin based material which is superior in weather resistance and heat resistance. The second lens 20 is made of polycarbonate based material which has a high refractive index and high dispersion. The third lens 30 is made of polyolefin based material which is lower in price than polycarbonate and there is an advantage that water absorbing property of the polyolefin based material is low.

Characteristics of the wide-angle lens 100 constituted as described above, physical properties and aspherical coefficients of respective faces are shown in Table 1.

TABLE 1

| Effective Focal Length(f0) | 1.117 mm |
|---|---|
| Total Track | 9.590 mm |
| Image Space F/# | 2.2 |
| Max. Field Angle | 166 deg |
| Horizontal Field Angle | 136 deg |
| ν 2 | 24.0 |
| ν 3 | 55.7 |
| n2 | 1.636 |
| R12 | 0.831 mm |
| ν 3/ν 2 | 2.32 |
| R12/f0 | 0.74 |

| Surf | Radius | Thickness | Nd | ν d | f |
|---|---|---|---|---|---|
| 1* | 11.100 | 1.400 | 1.492 | 57.8 | −1.913 |
| 2* | 0.831 | 1.930 | | | |
| 3* | 2.710 | 1.375 | 1.636 | 24.0 | 3.402 |
| 4* | −8.580 | 0.320 | | | |
| 5(stop) | Infinity | 0.470 | | | |
| 6* | 5.200 | 2.140 | 1.532 | 55.7 | 2.291 |
| 7* | −1.363 | 1.000 | | | |
| 8 | Infinity | 0.700 | 1.517 | 64.2 | |
| 9 | Infinity | 0.255 | | | |

| Surf | k | A3 | A4 | A5 | A6 |
|---|---|---|---|---|---|
| 1 | −3.33000E+02 | −2.36000E−03 | 6.00000E−04 | 3.27000E−05 | −6.65000E−06 |
| 2 | −8.55000E−01 | 0.00000E+00 | −3.68000E−02 | 0.00000E+00 | 5.00000E−03 |
| 3 | 0.00000E+00 | 0.00000E+00 | −1.54000E−02 | 0.00000E+00 | −6.55000E−03 |
| 4 | 0.00000E+00 | 0.00000E+00 | −3.44000E−02 | 0.00000E+00 | 3.10000E−02 |
| 6 | 0.00000E+00 | 0.00000E+00 | −8.44000E−02 | 0.00000E+00 | 6.20000E−02 |
| 7 | −2.19000E+00 | 0.00000E+00 | −2.50000E−02 | 0.00000E+00 | 8.11000E−03 |

| Surf | A7 | A8 | A9 | A10 |
|---|---|---|---|---|
| 1 | −1.70000E−06 | 1.98000E−07 | 0.00000E+00 | 0.00000E+00 |
| 2 | 0.00000E+00 | 1.90000E−03 | 0.00000E+00 | −2.19000E−04 |
| 3 | 0.00000E+00 | 0.00000E+00 | 0.00000E+00 | 0.00000E+00 |
| 4 | 0.00000E+00 | −2.43000E−02 | 0.00000E+00 | 7.45000E−03 |

TABLE 1-continued

| | | | | |
|---|---|---|---|---|
| 6 | 0.00000E+00 | −5.55000E−02 | 0.00000E+00 | 1.70000E−02 |
| 7 | 0.00000E+00 | −2.37000E−03 | 0.00000E+00 | 0.00000E+00 |

In the first column in Table 1, the following items are shown:
focal length of the entire lens system "f0" (Effective Focal Length)
object-image distance (Total Track)
"F"-value of the entire lens system (Image Space F/#)
maximum viewing angle (Max. Field Angle)
horizontal viewing angle (Horizontal Field Angle)
Abbe number "ν2" of the second lens 20
Abbe number "ν3" of the third lens 30
refractive index "n2" of the second lens 20
radius of curvature "R12" at the center of a second face 2 on an image side of the first lens 10
ratio "ν3/ν2" of the Abbe numbers of the second lens 20 and the third lens 30
ratio "R12/f0" of the radius of curvature "R12" and the focal length "f0"

Tables 2 through 5 described below are similarly shown as described above.

In the second column in Table 1, the following items of the respective faces are shown:
radius of curvature (Radius)
thickness (Thickness)
refractive index "Nd"
Abbe number "νd"
focal length "f"

The unit of the radius of curvature, the thickness and the focal length is "mm". Tables 2 through 5 described below are similarly shown.

In the third column and the fourth column in Table 1, the aspherical coefficients A3 through A10 are shown in a case that the shapes of respective faces 1 through 7 are expressed in the following expression (Equation 1). In the following expression, the axis in an optical axis direction is "z", the height in a direction perpendicular to the optical axis is "r", the conical coefficient is "k", and the inverse number of radius of curvature is "c". Tables 2 through 5 described below are similarly shown.

$$z = \frac{cr^2}{1 + \sqrt{(1-(1+k)c^2r^2)}} + \sum_{n=3}^{10} A_n |r|^n \quad \text{[Equation 1]}$$

As shown in Table 1, in the wide-angle lens 100 in this embodiment, the "F"-value is 2.2 and is not more than 2.4. The radius of curvature "R12" at the center of the second face 2 which is located on the image side in the first lens 10 is 0.831 mm and the focal length "f0" is 1.117 mm. Therefore, "R12/f0" is 0.74 and thus the wide-angle lens 100 satisfies the following condition "a":

$$R12/f0 \leq 0.9$$

Further, in the wide-angle lens 100 in this embodiment, the horizontal viewing angle is 136 degrees, which is not less than 120 degrees. The Abbe number "ν2" of the second lens 20 is 24.0, the Abbe number "ν3" of the third lens 30 is 55.7, and the refractive index "n2" of the second lens 20 is 1.636. Therefore, the "ν3/ν2" is 2.32 and thus the wide-angle lens 100 in this embodiment satisfies the following condition "b1":

$$1.60 < n2$$

$$2.0 \leq \nu 3/\nu 2$$

Further, in the wide-angle lens 100 in this embodiment, the radius of curvature "R31" at the center of the first face 6 of the third lens 30 which is located on the object side is 5.200 mm, and the radius of curvature "R32" at the center of the second face 7 of the third lens 30 which is located on the image side is −1.363 mm. Therefore, the wide-angle lens 100 in this embodiment satisfies the following condition "c":

$$R32 < R31$$

As described above, the wide-angle lens 100 in this embodiment is constituted to be three lenses in three groups and the three lenses are plastic lenses. Therefore, a cost of the wide-angle lens 100 can be reduced and its weight can be reduced. Further, in this embodiment, the second face 2 of the first lens 10 is formed in a shape which is deeply recessed to a level satisfying the condition "a" by utilizing that the first lens 10 is a plastic lens and, in addition, an aspherical lens is used as the first lens 10, the second lens 20 and the third lens 30. Therefore, according to this embodiment, as shown in FIG. 1(c), the astigmatism and field curvature can be improved while the lens is a wide-angle lens and thus the resolution can be improved and the "F"-value of the entire lens system can be reduced. In addition, even when the refractive index of each of the lenses is varied due to temperature change, the lens shapes of the second lens 20 and the third lens 30 between which the diaphragm 40 is interposed are formed in a biconvex shape having a positive power and thus the aberration of the second lens 20 and the aberration of the third lens 30 occurred by the temperature change are canceled by the respective aberrations to reduce deviation of the focusing position caused by the temperature change. Further, since the second face 2 of the first lens 10 is formed in a shape which is deeply recessed to a level satisfying the condition "a", the negative power of the first lens 10 becomes large. However, since the second lens 20 and the third lens 30 are formed in a biconvex lens, the positive power can be increased to shorten the focal length. Further, the wide-angle lens 100 in this embodiment satisfies the condition "b1" and thus, as shown in FIG. 1(b), the chromatic aberration can be improved.

[Second Embodiment]

Figure 2A:
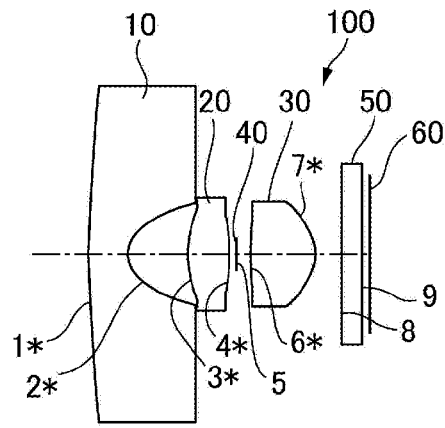
FIGS. 2(a), 2(b) and 2(c) are explanatory views showing a wide-angle lens in accordance with a second embodiment of the present invention.
Figure 2B:
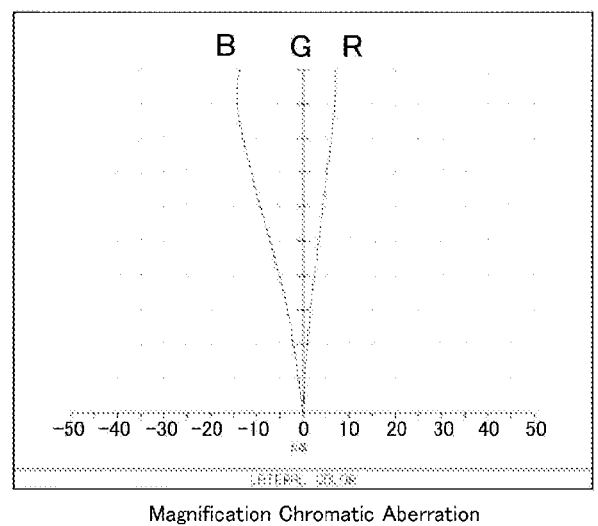
Figure 2C:
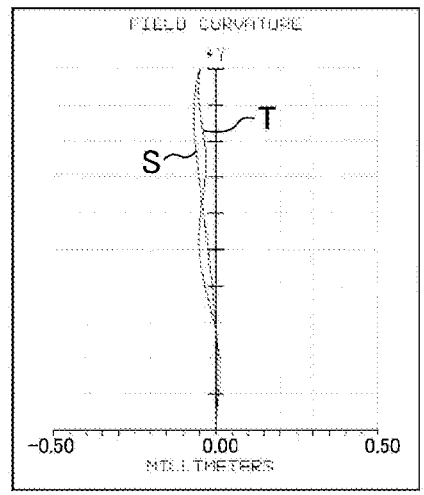

FIGS. 2(a), 2(b) and 2(c) are explanatory views showing a wide-angle lens in accordance with a second embodiment of the present invention. FIG. 2(a) is an explanatory view showing a constitution of the lens, FIG. 2(b) is an explanatory view showing characteristics of the magnification chromatic aberration, and FIG. 2(c) is an explanatory view showing the astigmatism/field curvature. Basic constitutions in the second embodiment and in the third, fourth and fifth embodiments described below are similar to the first embodiment and thus the same reference signs are used in corresponding portions and their descriptions are omitted.

As shown in FIG. 2(a), a wide-angle lens 100 in this embodiment is, similarly to the first embodiment, comprised of a first lens 10, a second lens 20, and a third lens 30 which are disposed in this order from an object side, and a diaphragm 40 is provided between the second lens 20 and the third lens 30 and thus the wide-angle lens 100 has a lens constitution of three lenses in three groups. A filter 50 and an imaging element 60 are disposed on an image side relative to the third lens 30. The first lens 10 is a plastic lens whose both faces are aspherical and having a negative meniscus shape whose convex surface is faced to an object side. The second lens 20 is a plastic lens in a biconvex shape whose at least one face is aspherical and the third lens 30 is a plastic lens in a biconvex shape whose at least one face is aspherical. In this embodiment, in the second lens 20 and the third lens 30, both faces are aspherical. Further, in this embodiment, the first lens 10 is made of acrylic resin based material which is superior in weather resistance and heat resistance. The second lens 20 is made of polycarbonate based material which has a high refractive index and high dispersion. The third lens 30 is made of polyolefin based material which is lower in price than polycarbonate and there is an advantage that water absorbing property of the polyolefin based material is low.

Characteristics of the wide-angle lens 100 constituted as described above, physical properties and aspherical coefficients of respective faces are shown in Table 2.

As shown in Table 2, in the wide-angle lens 100 in this embodiment, the "F"-value is 2.2, which is not more than 2.4. The radius of curvature "R12" at the center of the second face 2 which is located on the image side in the first lens 10 is 0.750 mm and the focal length "f0" is 1.013 mm. Therefore, "R12/f0" is 0.74 and thus the wide-angle lens 100 satisfies the following condition "a":

$R12/f0 \leq 0.9$

Further, in the wide-angle lens 100 in this embodiment, the horizontal viewing angle is 136 degrees, which is not less than 120 degrees. Further, the Abbe number "ν2" of the second lens 20 is 24.0, the Abbe number "ν3" of the third lens 30 is 55.7, and the refractive index "n2" of the second lens 20 is 1.636. Therefore, the "ν3/ν2" is 2.32 and thus the wide-angle lens 100 in this embodiment satisfies the following condition "b1":

$1.60 < n2$ $2.0 \leq \nu3/\nu2$

Further, in the wide-angle lens 100 in this embodiment, the radius of curvature "R31" at the center of the first face 6 of the third lens 30 which is located on the object side is 5.200 mm, and the radius of curvature "R32" at the center of the second face 7 of the third lens 30 which is located on the image side is −1.363 mm. Therefore, the wide-angle lens 100 in this embodiment satisfies the following condition "c":

$R32 < R31$

TABLE 2

| | | | |
|---|---|---|---|
| Effective Focal Length(f0) | | 1.013 | mm |
| Total Track | | 9.655 | mm |
| Image Space F/# | | 2.2 | |
| Max. Field Angle | | 165 | deg |
| Horizontal Field Angle | | 136 | deg |
| ν 2 | | 24.0 | |
| ν 3 | | 55.7 | |
| n2 | | 1.636 | |
| R12 | | 0.750 | mm |
| ν 3/ν 2 | | 2.32 | |
| R12/f0 | | 0.74 | |

| Surf | Radius | Thickness | Nd | ν d | f |
|---|---|---|---|---|---|
| 1* | 10.000 | 1.300 | 1.492 | 57.8 | −1.730 |
| 2* | 0.750 | 2.100 | | | |
| 3* | 2.710 | 1.375 | 1.636 | 24.0 | 3.402 |
| 4* | −8.580 | 0.320 | | | |
| 5(stop) | Infinity | 0.456 | | | |
| 6* | 5.200 | 2.159 | 1.532 | 55.7 | 2.293 |
| 7* | −1.363 | 1.000 | | | |
| 8 | Infinity | 0.700 | 1.517 | 64.2 | |
| 9 | Infinity | 0.245 | | | |

| Surf | k | A3 | A4 | A5 | A6 |
|---|---|---|---|---|---|
| 1 | −3.35000E+02 | −2.90000E−03 | 6.70000E−04 | 4.30000E−05 | −6.12000E−06 |
| 2 | −8.35000E−01 | 0.00000E+00 | −7.30000E−02 | 0.00000E+00 | 1.76000E−02 |
| 3 | 0.00000E+00 | 0.00000E+00 | −1.54000E−02 | 0.00000E+00 | −6.55000E−03 |
| 4 | 0.00000E+00 | 0.00000E+00 | −3.44000E−02 | 0.00000E+00 | 3.10000E−02 |
| 6 | 0.00000E+00 | 0.00000E+00 | −8.44000E−02 | 0.00000E+00 | 6.20000E−02 |
| 7 | −2.19000E+00 | 0.00000E+00 | −2.50000E−02 | 0.00000E+00 | 8.11000E−03 |

| Surf | A7 | A8 | A9 | A10 |
|---|---|---|---|---|
| 1 | −1.80000E−06 | 1.70000E−07 | 0.00000E+00 | 0.00000E+00 |
| 2 | 0.00000E+00 | −4.60000E−03 | 0.00000E+00 | 4.90000E−04 |
| 3 | 0.00000E+00 | 0.00000E+00 | 0.00000E+00 | 0.00000E+00 |
| 4 | 0.00000E+00 | −2.43000E−02 | 0.00000E+00 | 7.45000E−03 |
| 6 | 0.00000E+00 | −5.55000E−02 | 0.00000E+00 | 1.70000E−02 |
| 7 | 0.00000E+00 | −2.37000E−03 | 0.00000E+00 | 0.00000E+00 |

As described above, the wide-angle lens 100 in the second embodiment, similarly to the first embodiment, satisfies the conditions "a" and "b1". Therefore, as shown in FIG. 2(c), the astigmatism and field curvature can be improved while the lens is a wide-angle lens and thus the resolution can be improved. Further, the "F"-value of the entire lens system can be reduced. Further, similar effects to the first embodiment are attained, for example, the chromatic aberration can be improved as shown in FIG. 2(b).

[Third Embodiment]

Figure 3A:
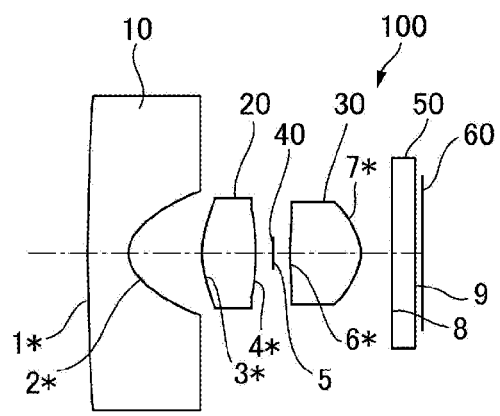
FIGS. 3(a), 3(b) and 3(c) are explanatory views showing a wide-angle lens in accordance with a third embodiment of the present invention.
Figure 3B:
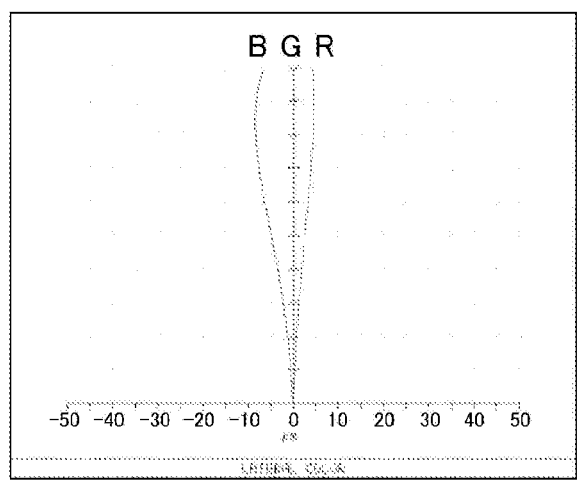
Figure 3C:
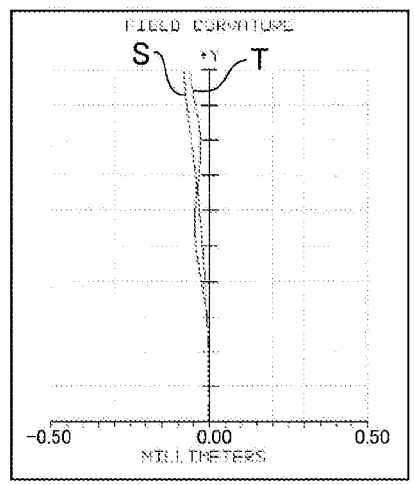

FIGS. 3(a), 3(b) and 3(c) are explanatory views showing a wide-angle lens in accordance with a third embodiment of the present invention. FIG. 3(a) is an explanatory view showing a constitution of the lens, FIG. 3(b) is an explanatory view showing characteristics of the magnification chromatic aberration, and FIG. 3(c) is an explanatory view showing the astigmatism/field curvature.

As shown in FIG. 3(a), a wide-angle lens 100 in this embodiment is, similarly to the first embodiment, comprised of a first lens 10, a second lens 20, and a third lens 30 which are disposed in this order from an object side, and a diaphragm 40 is provided between the second lens 20 and the third lens 30 and thus the wide-angle lens 100 has a lens constitution of three lenses in three groups. A filter 50 and an imaging element 60 are disposed on an image side relative to the third lens 30. The first lens 10 is a plastic lens whose both faces are aspherical and having a negative meniscus shape whose convex surface is faced to the object side. The second lens 20 is a plastic lens in a biconvex shape whose at least one face is aspherical and the third lens 30 is a plastic lens in a biconvex shape whose at least one face is aspherical. In this embodiment, in the second lens 20 and the third lens 30, both faces are aspherical. Further, in this embodiment, the first lens 10 is made of acrylic resin based material which is superior in weather resistance and heat resistance. The second lens 20 is made of polycarbonate based material which has a high refractive index and high dispersion. The third lens 30 is made of polyolefin based material which is lower in price than polycarbonate and there is an advantage that water absorbing property of the polyolefin based material is low.

Characteristics of the wide-angle lens 100 constituted as described above, physical properties and aspherical coefficients of respective faces are shown in Table 3.

TABLE 3

| | | |
|---|---|---|
| Effective Focal Length(f0) | 1.121 | mm |
| Total Track | 10.528 | mm |
| Image Space F/# | 2.2 | |
| Max. Field Angle | 147 | deg |
| Horizontal Field Angle | 122 | deg |
| ν 2 | 24.0 | |
| ν 3 | 55.7 | |
| n2 | 1.636 | |
| R12 | 0.899 | mm |
| ν 3/ν 2 | 2.32 | |
| R12/f0 | 0.80 | |

| Surf | Radius | Thickness | Nd | ν d | f |
|---|---|---|---|---|---|
| 1* | 17.752 | 1.300 | 1.492 | 57.8 | −1.976 |
| 2* | 0.899 | 2.305 | | | |
| 3* | 2.856 | 1.713 | 1.636 | 24.0 | 3.591 |
| 4* | −8.705 | 0.559 | | | |
| 5(stop) | Infinity | 0.462 | | | |
| 6* | 5.058 | 2.240 | 1.532 | 55.7 | 2.471 |
| 7* | −1.501 | 1.000 | | | |
| 8 | Infinity | 0.700 | 1.517 | 64.2 | |
| 9 | Infinity | 0.250 | | | |

| Surf | k | A3 | A4 | A5 | A6 |
|---|---|---|---|---|---|
| 1 | −3.50000E+02 | −2.03937E−03 | 3.51935E−04 | 1.50502E−05 | −3.86938E−06 |
| 2 | −8.68838E−01 | 0.00000E+00 | −2.79163E−02 | 0.00000E+00 | 2.07843E−03 |
| 3 | 0.00000E+00 | 0.00000E+00 | −1.03025E−02 | 0.00000E+00 | −2.85853E−03 |
| 4 | 0.00000E+00 | 0.00000E+00 | −2.13424E−02 | 0.00000E+00 | 1.57573E−02 |
| 6 | 0.00000E+00 | 0.00000E+00 | −6.71637E−02 | 0.00000E+00 | 3.42116E−02 |
| 7 | −2.26282E+00 | 0.00000E+00 | −1.30774E−02 | 0.00000E+00 | 3.87030E−03 |

| Sur | A7 | A8 | A9 | A10 |
|---|---|---|---|---|
| 1 | −7.31224E−07 | 9.66134E−08 | 0.00000E+00 | 0.00000E+00 |
| 2 | 0.00000E+00 | 5.57007E−04 | 0.00000E+00 | −1.34951E−04 |
| 3 | 0.00000E+00 | 0.00000E+00 | 0.00000E+00 | 0.00000E+00 |
| 4 | 0.00000E+00 | −8.32999E−03 | 0.00000E+00 | 1.75476E−03 |
| 6 | 0.00000E+00 | −1.54475E−02 | 0.00000E+00 | −8.98185E−04 |
| 7 | 0.00000E+00 | −1.51154E−03 | 0.00000E+00 | 0.00000E+00 |

As shown in Table 3, in the wide-angle lens 100 in this embodiment, the "F"-value is 2.2, which is not more than 2.4. The radius of curvature "R12" at the center of the second face 2 which is located on the image side in the first lens 10 is 0.899 mm and the focal length "f0" is 1.121 mm. Therefore, "R12/f0" is 0.80 and thus the wide-angle lens 100 satisfies the following condition "a":

$R12/f0 \leq 0.9$

Further, in the wide-angle lens 100 in this embodiment, the horizontal viewing angle is 122 degrees, which is not less than 120 degrees. The Abbe number "ν2" of the second lens 20 is 24.0, the Abbe number "ν3" of the third lens 30 is 55.7, and the refractive index "n2" of the second lens 20 is 1.636.

Therefore, the "ν3/ν2" is 2.32 and thus the wide-angle lens 100 in this embodiment satisfies the following condition "b1":

$$1.60 < n2$$

$$2.0 \leq \nu 3/\nu 2$$

Further, in the wide-angle lens 100 in this embodiment, the radius of curvature "R31" at the center of the first face 6 of the third lens 30 which is located on the object side is 5.058 mm, and the radius of curvature "R32" at the center of the second face 7 of the third lens 30 which is located on the image side is −1.501 mm. Therefore, the wide-angle lens 100 in this embodiment satisfies the following condition "c":

$$R32 < R31$$

As described above, the wide-angle lens 100 in the third embodiment, similarly to the first embodiment, satisfies the conditions "a" and "b1". Therefore, as shown in FIG. 3(c), the astigmatism and field curvature can be improved while the lens is a wide-angle lens and thus the resolution can be improved. Further, the "F"-value of the entire lens system can be reduced. Further, similar effects to the first embodiment are attained, for example, the chromatic aberration can be improved as shown in FIG. 3(b).

[Fourth Embodiment]

Figure 4A:
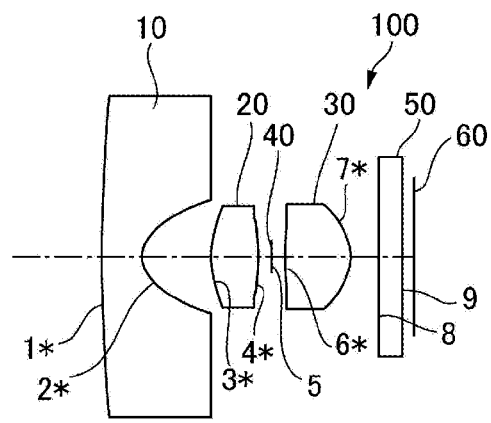
FIGS. 4(a), 4(b) and 4(c) are explanatory views showing a wide-angle lens in accordance with a fourth embodiment of the present invention.
Figure 4B:
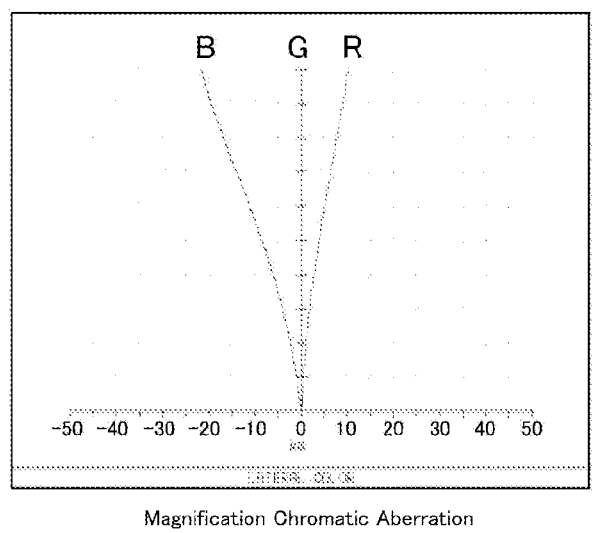
Figure 4C:
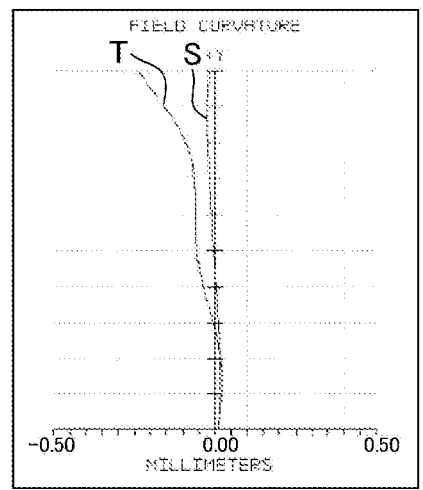

FIGS. 4(a), 4(b) and 4(c) are explanatory views showing a wide-angle lens in accordance with a fourth embodiment of the present invention. FIG. 4(a) is an explanatory view showing a constitution of the lens, FIG. 4(b) is an explanatory view showing characteristics of the magnification chromatic aberration, and FIG. 4(c) is an explanatory view showing the astigmatism/field curvature.

As shown in FIG. 4(a), a wide-angle lens 100 in this embodiment is, similarly to the first embodiment, comprised of a first lens 10, a second lens 20, and a third lens 30 which are disposed in this order from an object side, and a diaphragm 40 is provided between the second lens 20 and the third lens 30 and thus the wide-angle lens 100 has a lens constitution of three lenses in three groups. A filter 50 and an imaging element 60 are disposed on an image side relative to the third lens 30. The first lens 10 is a plastic lens whose both faces are aspherical and having a negative meniscus shape whose convex surface is faced to the object side. The second lens 20 is a plastic lens in a biconvex shape whose at least one face is aspherical and the third lens 30 is a plastic lens in a biconvex shape whose at least one face is aspherical. In this embodiment, in the second lens 20 and the third lens 30, both faces are aspherical. Further, in this embodiment, the first lens 10 is made of acrylic resin based material which is superior in weather resistance and heat resistance. The second lens 20 is made of polycarbonate based material which has a high refractive index and high dispersion. The third lens 30 is made of polyolefin based material which is lower in price than polycarbonate and there is an advantage that water absorbing property of the polyolefin based material is low.

Characteristics of the wide-angle lens 100 constituted as described above, physical properties and aspherical coefficients of respective faces are shown in Table 4.

TABLE 4

| Effective Focal Length(f0) | 1.023 mm |
|---|---|
| Total Track | 9.305 mm |
| Image Space F/# | 2.2 |
| Max. Field Angle | 166 deg |
| Horizontal Field Angle | 137 deg |
| ν 2 | 24.0 |
| ν 3 | 55.7 |
| n2 | 1.636 |
| R12 | 0.806 mm |
| ν 3/ν 2 | 2.32 |
| R12/f0 | 0.79 |

| Surf | Radius | Thickness | Nd | ν d | f |
|---|---|---|---|---|---|
| 1* | 11.039 | 1.200 | 1.492 | 57.8 | −1.840 |
| 2* | 0.806 | 2.053 | | | |
| 3* | 2.708 | 1.395 | 1.636 | 24.0 | 3.362 |
| 4* | −8.104 | 0.391 | | | |
| 5(stop) | Infinity | 0.427 | | | |
| 6* | 4.548 | 1.996 | 1.532 | 55.7 | 2.216 |
| 7* | −1.347 | 0.800 | | | |
| 8 | Infinity | 0.700 | 1.517 | 64.2 | |
| 9 | Infinity | 0.344 | | | |

| Surf | k | A3 | A4 | A5 | A6 |
|---|---|---|---|---|---|
| 1 | −3.34603E+02 | −2.38477E−03 | 5.91820E−04 | 3.48253E−05 | −6.87715E−06 |
| 2 | −8.56061E−01 | 0.00000E+00 | −3.91947E−02 | 0.00000E+00 | 4.58656E−03 |
| 3 | 0.00000E+00 | 0.00000E+00 | −1.45071E−02 | 0.00000E+00 | −6.28849E−03 |
| 4 | 0.00000E+00 | 0.00000E+00 | −3.52078E−02 | 0.00000E+00 | 3.31132E−02 |
| 6 | 0.00000E+00 | 0.00000E+00 | −8.99860E−02 | 0.00000E+00 | 6.00237E−02 |
| 7 | −2.26270E+00 | 0.00000E+00 | −2.43856E−02 | 0.00000E+00 | 7.91212E−03 |

| Surf | A7 | A8 | A9 | A10 |
|---|---|---|---|---|
| 1 | −1.71354E−06 | 2.00284E−07 | 0.00000E+00 | 0.00000E+00 |
| 2 | 0.00000E+00 | 1.91777E−03 | 0.00000E+00 | −1.75548E−04 |
| 3 | 0.00000E+00 | 0.00000E+00 | 0.00000E+00 | 0.00000E+00 |
| 4 | 0.00000E+00 | −2.33263E−02 | 0.00000E+00 | 6.49569E−03 |
| 6 | 0.00000E+00 | −5.31142E−02 | 0.00000E+00 | 1.84182E−02 |
| 7 | 0.00000E+00 | −2.55209E−03 | 0.00000E+00 | 0.00000E+00 |

As shown in Table 4, in the wide-angle lens 100 in this embodiment, the "F"-value is 2.2, which is not more than 2.4. The radius of curvature "R12" at the center of the second face 2 which is located on the image side in the first lens 10 is 0.806 mm and the focal length "f0" is 1.023 mm. Therefore, "R12/f0" is 0.79 and thus the wide-angle lens 100 satisfies the following condition "a":

$R12/f0 \leq 0.9$

Further, in the wide-angle lens 100 in this embodiment, the horizontal viewing angle is 137 degrees, which is not less than 120 degrees. The Abbe number "v2" of the second lens 20 is 24.0, the Abbe number "v3" of the third lens 30 is 55.7, and the refractive index "n2" of the second lens 20 is 1.636. Therefore, the "v3/v2" is 2.32 and thus the wide-angle lens 100 in this embodiment satisfies the following condition "b1":

$1.60 < n2$ $2.0 \leq v3/v2$

Further, in the wide-angle lens 100 in this embodiment, the radius of curvature "R31" at the center of the first face 6 of the third lens 30 which is located on the object side is 4.548 mm, and the radius of curvature "R32" at the center of the second face 7 of the third lens 30 which is located on the image side is −1.347 mm. Therefore, the wide-angle lens 100 in this embodiment satisfies the following condition "c":

$R32 < R31$

As described above, the wide-angle lens 100 in the fourth embodiment, similarly to the first embodiment, satisfies the conditions "a" and "b1". Therefore, as shown in FIG. 4(c), the astigmatism and field curvature can be improved while the lens is a wide-angle lens and thus the resolution can be improved. Further, the "F"-value of the entire lens system can be reduced. Further, similar effects to the first embodiment are attained, for example, the chromatic aberration can be improved as shown in FIG. 4(b).

[Fifth Embodiment]

Figure 5A:
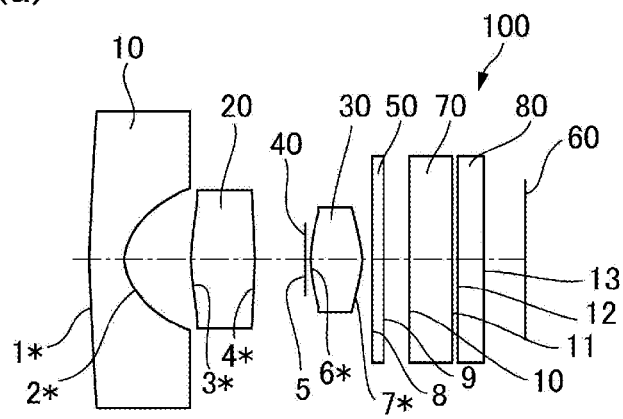
FIGS. 5(a), 5(b) and 5(c) are explanatory views showing a wide-angle lens in accordance with a fifth embodiment of the present invention.
Figure 5B:
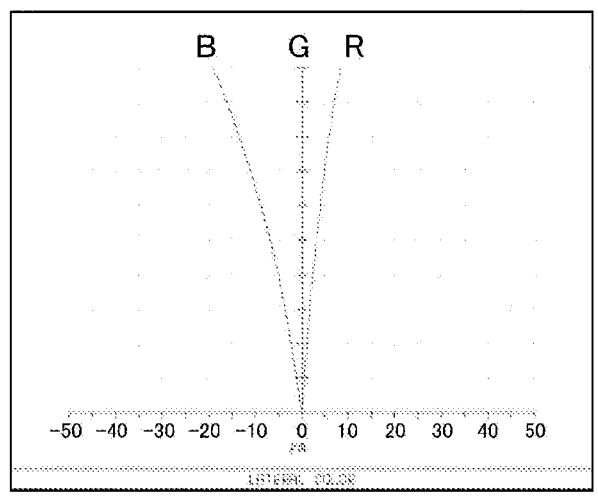
Figure 5C:
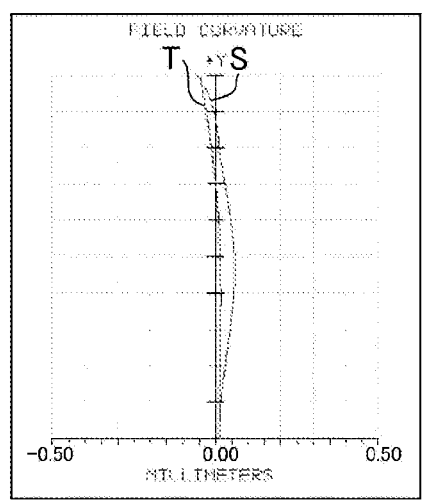

FIGS. 5(a), 5(b) and 5(c) are explanatory views showing a wide-angle lens in accordance with a fifth embodiment of the present invention. FIG. 5(a) is an explanatory view showing a constitution of the lens, FIG. 5(b) is an explanatory view showing characteristics of the magnification chromatic aberration, and FIG. 5(c) is an explanatory view showing the astigmatism/field curvature.

As shown in FIG. 5(a), a wide-angle lens 100 in this embodiment is, similarly to the first embodiment, comprised of a first lens 10, a second lens 20, and a third lens 30 which are disposed in this order from an object side, and a diaphragm 40 is provided between the second lens 20 and the third lens 30 and thus the wide-angle lens 100 has a lens constitution of three lenses in three groups. A filter 50 and an imaging element 60 are disposed on an image side relative to the third lens 30 and translucent covers 70 and 80 are disposed between the filter 50 and the imaging element 60. The first lens 10 is a plastic lens whose both faces are aspherical and having a negative meniscus shape whose convex surface is faced to the object side. The second lens 20 is a plastic lens in a biconvex shape whose at least one face is aspherical and the third lens 30 is a plastic lens in a biconvex shape whose at least one face is aspherical. In this embodiment, in the second lens 20 and the third lens 30, both faces are aspherical.

Further, in this embodiment, the first lens 10 is made of acrylic resin based material which is superior in weather resistance and heat resistance. The second lens 20 is made of polycarbonate based material. The third lens 30 is made of polyolefin based material whose water absorbing property is low.

Characteristics of the wide-angle lens 100 constituted as described above, physical properties and aspherical coefficients of respective faces are shown in Table 5.

TABLE 5

| | | |
|---|---|---|
| Effective Focal Length(f0) | 2.140 | mm |
| Total Track | 12.560 | mm |
| Image Space F/# | 2.0 | |
| Max. Field Angle | 114 | deg |
| Horizontal Field Angle | 92 | deg |
| v 2 | 30.2 | |
| v 3 | 55.7 | |
| n2 | 1.583 | |
| R12 | 1.405 | mm |
| v 3 / v 2 | 1.84 | |
| R12/f0 | 0.66 | |

| Surf | Radius | Thickness | Nd | v d | f |
|---|---|---|---|---|---|
| 1* | 21.100 | 1.000 | 1.492 | 57.8 | −3.114 |
| 2* | 1.405 | 1.930 | | | |
| 3* | 5.600 | 1.830 | 1.583 | 30.2 | 8.389 |
| 4* | −34.000 | 1.454 | | | |
| 5(stop) | Infinity | 0.141 | | | |
| 6* | 3.900 | 1.500 | 1.532 | 55.7 | 3.474 |
| 7* | −3.040 | 0.300 | | | |
| 8 | Infinity | 0.300 | 1.517 | 64.2 | |
| 9 | Infinity | 0.760 | | | |
| 10 | Infinity | 1.220 | 1.544 | 70.1 | |
| 11 | Infinity | 0.180 | | | |
| 12 | Infinity | 0.750 | 1.517 | 64.2 | |
| 13 | Infinity | 1.195 | | | |

| Surf | k | A3 | A4 | A5 | A6 |
|---|---|---|---|---|---|
| 1 | 0.00000E+00 | 0.00000E+00 | −1.10000E−03 | 0.00000E+00 | 1.83000E−05 |
| 2 | −8.35000E−01 | 0.00000E+00 | 1.20000E−02 | 0.00000E+00 | 5.30000E−04 |
| 3 | 0.00000E+00 | 0.00000E+00 | −6.41000E−03 | 0.00000E+00 | −1.08000E−03 |

TABLE 5-continued

| 4 | 0.00000E+00 | 0.00000E+00 | −5.64000E−03 | 0.00000E+00 | −7.50000E−04 |
| 6 | 0.00000E+00 | 0.00000E+00 | −3.15000E−03 | 0.00000E+00 | 1.10000E−03 |
| 7 | −2.80000E+00 | 0.00000E+00 | 3.36000E−03 | 0.00000E+00 | 8.61000E−04 |

| Surf | A7 | A8 | A9 | A10 |
|---|---|---|---|---|
| 1 | 0.00000E+00 | 4.38000E−07 | 0.00000E+00 | 0.00000E+00 |
| 2 | 0.00000E+00 | −2.14000E−04 | 0.00000E+00 | 0.00000E+00 |
| 3 | 0.00000E+00 | −1.34000E−04 | 0.00000E+00 | 0.00000E+00 |
| 4 | 0.00000E+00 | 3.32000E−04 | 0.00000E+00 | 0.00000E+00 |
| 6 | 0.00000E+00 | 4.68000E−04 | 0.00000E+00 | 0.00000E+00 |
| 7 | 0.00000E+00 | 5.56000E−04 | 0.00000E+00 | 0.00000E+00 |

As shown in Table 5, in the wide-angle lens 100 in this embodiment, the "F"-value is 2.0, which is not more than 2.4. The radius of curvature "R12" at the center of the second face 2 which is located on the image side in the first lens 10 is 1.405 mm and the focal length "f0" is 2.140 mm. Therefore, "R12/f0" is 0.66 and thus the wide-angle lens 100 satisfies the following condition "a":

$R12/f0 \leq 0.9$

Further, in the wide-angle lens 100 in this embodiment, the horizontal viewing angle is 92 degrees, which is not less than 90 degrees and less than 120 degrees. The Abbe number "v2" of the second lens 20 is 30.2, the Abbe number "v3" of the third lens 30 is 55.7, and the refractive index "n2" of the second lens 20 is 1.583. Therefore, the "v3/v2" is 1.84 and thus the wide-angle lens 100 in this embodiment satisfies the following condition "b2":

$1.55 < n2$ $1.5 < v3/v2 < 2.0$

Further, in the wide-angle lens 100 in this embodiment, the radius of curvature "R31" at the center of the first face 6 of the third lens 30 which is located on the object side is 3.900 mm, and the radius of curvature "R32" at the center of the second face 7 of the third lens 30 which is located on the image side is −3.040 mm. Therefore, the wide-angle lens 100 in this embodiment satisfies the following condition "c":

$R32 < R31$

As described above, the wide-angle lens 100 in the fifth embodiment satisfies the conditions "a" and "b2". Therefore, as shown in FIG. 5(c), the astigmatism and field curvature can be improved while the lens is a wide-angle lens and thus the resolution can be improved. Further, the "F"-value of the entire lens system can be reduced. Further, similar effects to the first embodiment are attained, for example, the chromatic aberration can be improved as shown in FIG. 5(b).

[Improved Examples of First Through Fifth Embodiments]

In the wide-angle lens 100 in accordance with the first through the fifth embodiments, it is preferable that a hard coating made of a translucent layer such as a metal oxide film is applied to the first face 1 located on the object side in the first lens 10. According to this structure, even when the first lens 10 is a plastic lens, scratch resistance and abrasion resistance of the first face 1 can be improved. Therefore, occurrence of ghost flare caused by a scratch or abrasion on the first face 1 of the first lens 10 can be suppressed.

[Other Embodiments]

Various types of lens constitution other than the above-mentioned embodiments have been examined. As a result, when the following condition "a" is satisfied, $R12/f0 \leq 0.9$ the astigmatism, the field curvature and the like can be improved while the lens is a wide-angle lens and the "F"-value of the entire lens system can be reduced. On the other hand, when "R12/f0" exceeds 0.9, the second face 2 of the first lens 10 becomes a shallow recessed face, which approaches a spherical shape from an aspherical shape and, as a result, the aberration is not corrected. Therefore, the range of the condition "a" is preferable. In this case, as the "R12/f0" becomes smaller than 0.9, the second face 2 of the first lens 10 is deeply recessed and thus the lens is difficult to be formed of glass but, when plastic is used, the lens is formed easily.

Further, in a case that the horizontal viewing angle is not less than 120 degrees, when the above-mentioned condition "b1" is satisfied, the chromatic aberration can be improved. However, in a case that "n2" is not more than 1.60 or, in a case that "2.0>v3/v2", the merit is decreased in the chromatic aberration. Therefore, the range of the condition "b1" is preferable.

In a case that the horizontal viewing angle is not less than 90 degrees and less than 120 degrees, the chromatic aberration can be sufficiently reduced even in a case of the condition "b2".

Further, in the embodiments described above, both faces of each of the second lens 20 and the third lens 30 are aspherical. However, a plastic lens whose one face is aspherical may be used as one or both of the second lens 20 and the third lens 30.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A wide-angle lens for use in imaging an object, the wide-angle lens comprising:
    a first lens which is a plastic lens having first and second faces that are aspherical and having a negative meniscus shape with a convex surface facing an object side;
    a second lens which is a plastic lens in a biconvex shape having at least one aspherical face;
    a third lens which is a plastic lens in a biconvex shape having at least one aspherical face; and
    a diaphragm which is provided between the second lens and the third lens;

wherein the first lens, the second lens, and the third lens are disposed such that the first lens is closest to the object side, the second lens is between the first lens and the third lens; and wherein when a radius of curvature at a center of the second face located on an image side of the first lens is "R12" (mm) and a focal length of the wide-angle lens is "f0" (mm), a following condition is satisfied:

$0.66 \leq R12/f0 \leq 0.9$.

2. The wide-angle lens according to claim 1, wherein when a horizontal viewing angle of the wide angle lens is not less than 120 degrees, an Abbe number of the second lens is "ν2", an Abbe number of the third lens is "ν3", and a refractive index of the second lens is "n2", following conditions are satisfied:

$1.60 < n2$ $2.0 \leq \nu3/\nu2$.

3. The wide-angle lens according to claim 1, wherein when a horizontal viewing angle of the wide-angle lens is not less than 90 degrees and less than 120 degrees, an Abbe number of the second lens is "ν2", an Abbe number of the third lens is "ν3", and a refractive index of the second lens is "n2", following conditions are satisfied:

$1.55 < n2$ $1.5 < \nu3/\nu2 < 2.0$.

4. The wide-angle lens according to claim 1, wherein hard coating is applied on a first face located on the object side of the first lens.

5. The wide-angle lens according to claim 1, wherein an "F"-value indicating brightness of the entire lens system is not more than 2.4.

6. The wide-angle lens according to claim 1, wherein
when a radius of curvature of a first face located on an object side of the third lens is "R31"(mm) and a radius of curvature of a second face located on an image side of the third lens is "R32"(mm), a following condition is satisfied:

$|R32| < |R31|$.

7. The wide-angle lens according to claim 1, wherein both faces of each of the second lens and the third lens are aspherical.

8. The wide-angle lens according to claim 1, wherein when a radius of curvature at a center of a first face located on an object side of the first lens is "R11" (mm), a following condition is satisfied:

$13.33 \leq R11/R12 \leq 19.76$.

9. The wide-angle lens according to claim 1, wherein when a radius of curvature at a center of a first face located on an object side of the first lens is "R11" (mm), a following condition is satisfied:

$9.86 \leq |R11/f0| \leq 15.84$.

* * * * *